(12) United States Patent
He et al.

(10) Patent No.: US 10,592,032 B2
(45) Date of Patent: Mar. 17, 2020

(54) DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Quanhua He, Beijing (CN); Lingyun Shi, Beijing (CN); Hao Zhang, Beijing (CN); Tiankuo Shi, Beijing (CN); Xiaobo Xie, Beijing (CN); Jian Bai, Beijing (CN); Chao Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 114 days.

(21) Appl. No.: 15/537,840

(22) PCT Filed: Jul. 12, 2016

(86) PCT No.: PCT/CN2016/089784
§ 371 (c)(1),
(2) Date: Jun. 19, 2017

(87) PCT Pub. No.: WO2017/156938
PCT Pub. Date: Sep. 21, 2017

(65) Prior Publication Data
US 2018/0107323 A1 Apr. 19, 2018

(30) Foreign Application Priority Data
Mar. 18, 2016 (CN) .......................... 2016 1 0159260

(51) Int. Cl.
*G06F 3/041* (2006.01)
*G02F 1/1333* (2006.01)
(Continued)

(52) U.S. Cl.
CPC .......... *G06F 3/0414* (2013.01); *G02F 1/1339* (2013.01); *G02F 1/13338* (2013.01);
(Continued)

(58) Field of Classification Search
USPC ....................................................... 345/173
See application file for complete search history.

(56) References Cited

U.S. PATENT DOCUMENTS

2008/0246735 A1* 10/2008 Reynolds ................ G06F 3/016
345/173
2009/0102814 A1* 4/2009 Lin .......................... G06F 3/044
345/174
(Continued)

FOREIGN PATENT DOCUMENTS

CN 101739183 A 6/2010
CN 103235439 A 8/2013
(Continued)

OTHER PUBLICATIONS

Office Action received for Chinese Patent Application No. 201610159260.2, dated Dec. 1, 2017, 12 pages (6 pages of English Translation and 6 pages of Office Action).
(Continued)

*Primary Examiner* — Chineyere D Wills-Burns
(74) *Attorney, Agent, or Firm* — Womble Bond Dickinson (US) LLP

(57) ABSTRACT

The present disclosure discloses a display panel and a display device for improving touch sensitivity of the display device, improving structural stability of the display device, and extending service life of the display device. The display
(Continued)

panel provided by the disclosure comprises: a first substrate and a second substrate disposed opposite to each other; a plurality of force sensitive touch units located between the first substrate and the second substrate, each of said plurality of force sensitive touch units being electrically connected to a touch circuit of the display panel; wherein each of said force sensitive touch units includes: a first conductive layer and a second conductive layer arranged in parallel to each other, and a compressible insulating layer filled between the first conductive layer and the second conductive layer.

10 Claims, 2 Drawing Sheets

(51) Int. Cl.
  *G06F 3/044* (2006.01)
  *G02F 1/1335* (2006.01)
  *G02F 1/1339* (2006.01)

(52) U.S. Cl.
  CPC .. *G02F 1/133345* (2013.01); *G02F 1/133512* (2013.01); *G06F 3/041* (2013.01); *G02F 2202/022* (2013.01); *G06F 3/044* (2013.01); *G06F 2203/04105* (2013.01)

(56) References Cited

U.S. PATENT DOCUMENTS

| | | | |
|---|---|---|---|
| 2009/0237374 A1* | 9/2009 | Li | G06F 3/0414 345/174 |
| 2010/0020039 A1* | 1/2010 | Ricks | G02F 1/13338 345/173 |
| 2011/0001723 A1* | 1/2011 | Fan | G06F 3/0412 345/174 |
| 2013/0172052 A1* | 7/2013 | Bengtsson | G06F 3/041 455/566 |
| 2015/0043174 A1* | 2/2015 | Han | G02F 1/13452 361/749 |
| 2015/0062068 A1 | 3/2015 | Shih et al. | |
| 2015/0109540 A1* | 4/2015 | Chang | G06F 3/0412 349/12 |
| 2015/0331508 A1* | 11/2015 | Nho | G06F 3/0421 345/173 |
| 2016/0103544 A1* | 4/2016 | Filiz | G06F 3/0414 345/174 |
| 2017/0269756 A1 | 9/2017 | Wang et al. | |

FOREIGN PATENT DOCUMENTS

| | | |
|---|---|---|
| CN | 103294239 A | 9/2013 |
| CN | 203480481 U | 3/2014 |
| CN | 103823592 A | 5/2014 |
| CN | 104423740 A | 3/2015 |
| CN | 104834419 A | 8/2015 |
| CN | 105117091 A | 12/2015 |
| CN | 105183257 A | 12/2015 |
| CN | 204833200 U | 12/2015 |
| CN | 105589614 A | 5/2016 |

OTHER PUBLICATIONS

Office Action received for Chinese Patent Application No. 201610159260.2, dated Jun. 26, 2018, 13 pages (7 pages of English Translation and 6 pages of Office Action).

International Preliminary Report on Patentability received for PCT Patent Application No. PCT/CN2016/089784, dated Sep. 27, 2018, 14 pages (9 pages of English Translation and 5 pages of Original Document).

International Search Report and Written Opinion in PCT/CN2016/089784 dated Dec. 15, 2016, with English translation.

* cited by examiner

DISPLAY PANEL AND DISPLAY DEVICE

The present application is the U.S. national phase entry of PCT/CN2016/089784, with an international filing date of Jul. 12, 2016, which claims the benefit of Chinese Patent Application No. 201610159260.2, filed on Mar. 18, 2016, the entire disclosure of which is incorporated herein by reference.

TECHNICAL FIELD

The present disclosure relates to the technical field of display, in particular to a display panel and a display device.

BACKGROUND

With the development of display technologies, touch display devices become increasingly popular with users. The touch display device can generally be characterized as a device capable of receiving a touch input on the device surface. The input may include the location of one or more touches on the device, and the location may be interpreted as a command, gesture, or other types of user inputs. In one example, the touch input on the touch device may be forwarded to a computing system and used to interpret the interaction between the user and the graphical user interface (GUI), including, for example, selecting elements on the display device, redirecting or repositioning elements, input texts and user inputs on the display device.

Typically, the touch input on the touch device is limited to the location of touch on the touch device. However, in some cases it is also advantageous to detect and measure the touch force applied to the device.

Namely, it is possible to make the touch display device perform different operations according to the different touch forces of the user. For example, the user may provide an input of a light touch (that is interpreted as a first mode), a medium touch (that is interpreted as a second mode), a heavy touch (that is interpreted as a third mode) or the like.

In the prior art, in order to enable the touch device to execute different input operation commands according to different touch forces of the user, a force sensing structure is usually provided between a housing and a display panel of the touch device. However, in this way of arrangement, the force sensing structure can be easily damaged, and impurities can easily enter the space between the housing and the display panel, thus affecting the service life of the touch display device.

SUMMARY

The present disclosure provides a display panel and a display device for improving touch sensitivity of the display device, improving structural stability of the display device, and thereby extending the service life of the display device.

According to one aspect, the present disclosure provides a display panel, which comprises: a first substrate and a second substrate disposed opposite to each other; a plurality of force sensitive touch units located between the first substrate and the second substrate, each of said plurality of force sensitive touch units being electrically connected to a touch circuit of the display panel. Each of said force sensitive touch units includes a first conductive layer and a second conductive layer arranged in parallel to each other, and a compressible insulating layer filled between the first conductive layer and the second conductive layer.

The display panel provided by the present disclosure has a force sensitive touch unit provided therein. When the touch panel is touched by different forces, the force sensitive touch unit will bend, and the compressible insulating layer included therein will deform. When a distance between the first conductive layer and the second conductive layer changes, capacitance of the force sensitive touch unit will change depending on the different touch forces. A control element in the display panel will control the display panel to perform corresponding operations according to changes of the capacitance. Since the force sensitive touch unit provided by the present disclosure is located inside the display panel, sensitivity of the force sensitive touch unit will not be affected by impurities from the outside.

The display panel provided by the present disclosure can improve touch sensitivity of the display device, improve structural stability of the display device, and extend the service life of the display device.

In one embodiment, each of the force sensitive touch units has a sawtooth structure. Such a structure can increase the contact area between the two capacitive conductive layers and improve sensitivity of the force sensitive touch units.

In one embodiment, each of the force sensitive touch units is a wavy structure. Such a structure can increase the contact area between the two capacitive conductive layers and improve sensitivity of the force sensitive touch unit.

In one embodiment, the material of the compressible insulating layer comprises: polyvinylidene fluoride. The compressible insulating layer of this material has a high dielectric constant, high flexibility and stability. On the one hand, it can function to isolate the first conductive layer from the second conductive layer; and on the other hand, it can deform, so that the force sensitive touch unit can deform when being subjected to a force. Changes of the distance between the first conductive layer and the second conductive layer will result in changes of the capacitance of the force sensitive touch units.

In one embodiment, a black matrix layer of the display panel comprises: a first sub-black matrix layer and a second sub-black matrix layer disposed opposite to each other. The plurality of force sensitive touch units are located between the first sub-black matrix layer and the second sub-black matrix layer, and the plurality of force sensitive touch units are electrically connected to the touch circuit through data lines provided on the second sub-black matrix layer.

In one embodiment, when each of the force sensitive touch units has a sawtooth structure, a side of the first sub-black matrix layer facing the second sub-black matrix layer and a side of the second sub-black matrix layer facing the first sub-black matrix layer both have a sawtooth structure.

In one embodiment, a frame sealant layer of the display panel comprises: a first sub-frame sealant layer and a second sub-frame sealant layer disposed opposite to each other. The plurality of force sensitive touch units are located between the first sub-frame sealant layer and the second sub-frame sealant layer, and the plurality of force sensitive touch units are electrically connected to said touch circuit through data lines provided on said second sub-frame sealant layer.

In one embodiment, when each of the force sensitive touch units has a sawtooth structure, a side of the first sub-frame sealant layer facing the second sub-frame sealant layer and a side of the second sub-frame sealant layer facing the first sub-frame sealant layer both have a sawtooth structure.

In one embodiment, each of the force sensitive touch units further comprises silica balls filled in the compressible insulating layer. The silica balls function as a support, and they can both prevent leakage of liquid crystals in the display panel owing to external forces, and prevent major deformation of frame sealant areas around the display panel owing to large external forces.

According to another aspect, the present disclosure also provides a display device comprising the display panel according to any one of the above-described embodiments. Since the above-described display panel can improve touch sensitivity of the display device, improve structural stability of the display device and extend the service life of the display device, the display device provided by the present disclosure has better touch sensitivity, higher structural stability and longer service life.

BRIEF DESCRIPTION OF THE DRAWINGS

The drawings described herein are provided to facilitate further understanding of the disclosure and constitute a part of the disclosure. Exemplary embodiments of the disclosure and their descriptions are intended to be illustrative of the disclosure and are not to be construed as limiting the disclosure. In the drawings.

DETAILED DESCRIPTION

Figure 1:
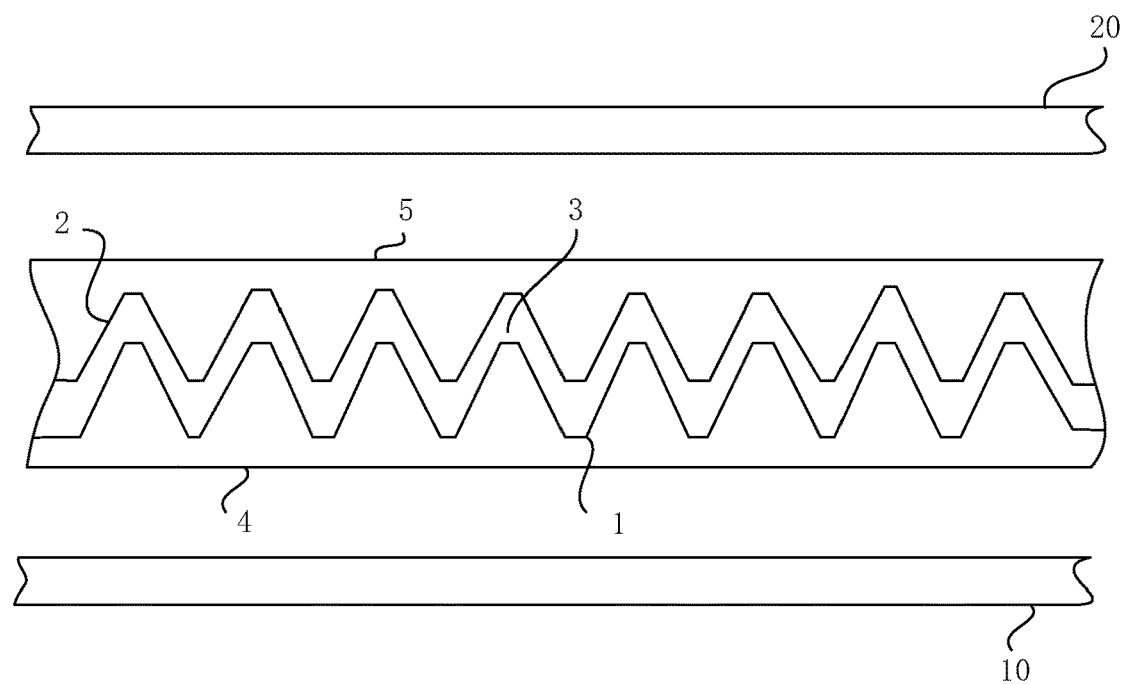
FIG. 1 is a schematic sectional view of a partial structure of a display panel provided in an embodiment of the present disclosure.

In the drawings:
1—first conductive layer
2—second conductive layer
3—compressible insulating layer
4—first sub-black matrix layer
5—second sub-black matrix layer
6—first sub-frame sealant layer
7—second sub-frame sealant layer
8—silica ball Technical solutions in the embodiments of the present disclosure will now be described clearly and completely in conjunction with the drawings. Apparently the described embodiments are merely some instead of all of the embodiments of the disclosure.

FIG. 1 is a schematic sectional view of a partial structure of a display panel provided in an embodiment of the present disclosure. The present disclosure provides a display panel, comprising: a first substrate 10 and a second substrate 20 disposed opposite to each other; a plurality of force sensitive touch units located between the first substrate 10 and the second substrate 20, each of said plurality of force sensitive touch units being electrically connected to a touch circuit of the display panel. Each of said force sensitive touch units includes a first conductive layer 1 and a second conductive layer 2 arranged in parallel to each other, and a compressible insulating layer 3 filled between the first conductive layer 1 and the second conductive layer 2.

The display panel provided by the present disclosure has a force sensitive touch unit provided therein. When the touch panel is touched by different forces, the force sensitive touch unit will bend, and the compressible insulating layer included therein will deform. When a distance between the first conductive layer 1 and the second conductive layer 2 changes, capacitance of the force sensitive touch unit will change depending on the different touch forces. A control element in the display panel will control the display panel to perform corresponding operations according to changes of the capacitance. That is, the display device can sense the difference between light touch and pressing by means of the force sensitive touch unit and then trigger a series of corresponding reactions according to the actual circumstances. Since the force sensitive touch unit provided by the present disclosure is located inside the display panel, sensitivity of the force sensitive touch unit will not be affected by impurities from the outside.

Therefore, the display panel provided by the present disclosure can improve touch sensitivity of the display device, improve structural stability of the display device, and extend the service life of the display device.

Said compressible insulating layer can function to isolate the first conductive layer from the second conductive layer on the one hand, and on the other hand, it can deform, so that the force sensitive touch unit can deform when being subjected to a force. Changes of the distance between the first conductive layer and the second conductive layer will result in changes of the capacitance of the force sensitive touch units.

Said force sensitive touch units may have various shapes. In one embodiment, each of the force sensitive touch units has a sawtooth structure. Such a structure can increase the contact area between the two capacitive conductive layers and improve sensitivity of the force sensitive touch units. The slope of each tooth of the sawtooth structure is 0 degree to 89 degrees. In another embodiment, each of the force sensitive touch units has a wavy structure. Such a structure can increase the contact area between the two capacitive conductive layers and improve sensitivity of the force sensitive touch unit. Of course, the specific shapes of the force sensitive touch unit are not limited to the listed shapes, and they will not be detailed herein.

The above-mentioned compressible material is generally made of a material having a high dielectric constant. In one embodiment, the material of the compressible insulating layer 3 may include polyvinylidene fluoride. The compressible insulating layer 3 made of this material has a high dielectric constant, and high flexibility and stability.

The specific location of the above-mentioned force sensitive touch unit can be varied.

In one embodiment, the force sensitive touch units are located in the black matrix layer. The black matrix layer of the display panel comprises a first sub-black matrix layer 4 and a second sub-black matrix layer 5 disposed opposite to each other. The plurality of force sensitive touch units are located between the first sub-black matrix layer 4 and the second sub-black matrix layer 5, and the plurality of force sensitive touch units are electrically connected to the touch circuit through data lines provided on the second sub-black matrix layer 5. The preparation thereof is convenient.

When each of the force sensitive touch units has a sawtooth structure, a side of the first sub-black matrix layer 4 facing the second sub-black matrix layer 5 and a side of the second sub-black matrix layer 5 facing the first sub-black matrix layer 4 both have a sawtooth structure. During preparation, the first sub-black matrix layer 4 is formed first, whose upper surface has a sawtooth shape, and whose lower surface is a plane. The first conductive layer 1 is formed on the upper surface of the first sub-black matrix layer 4 by means of spraying or sputtering. Then the compressible insulating layer 3 is formed on the first conductive layer 1 by spraying. After forming the compressible insulating layer 3 by spraying, the upper surface of the compressible insulating layer 3 is still a sawtooth structure having the original slope. The second conductive layer 2 is formed on the upper surface of the compressible insulating layer 3. The distance between the two capacitive conductive layers can be set according to the actual need. Finally the second sub-black matrix layer 5 is prepared on the second conductive layer 2, whose upper surface is a plane.

The plurality of force sensitive touch units may be a one-piece structure or a split structure.

Figure 2:
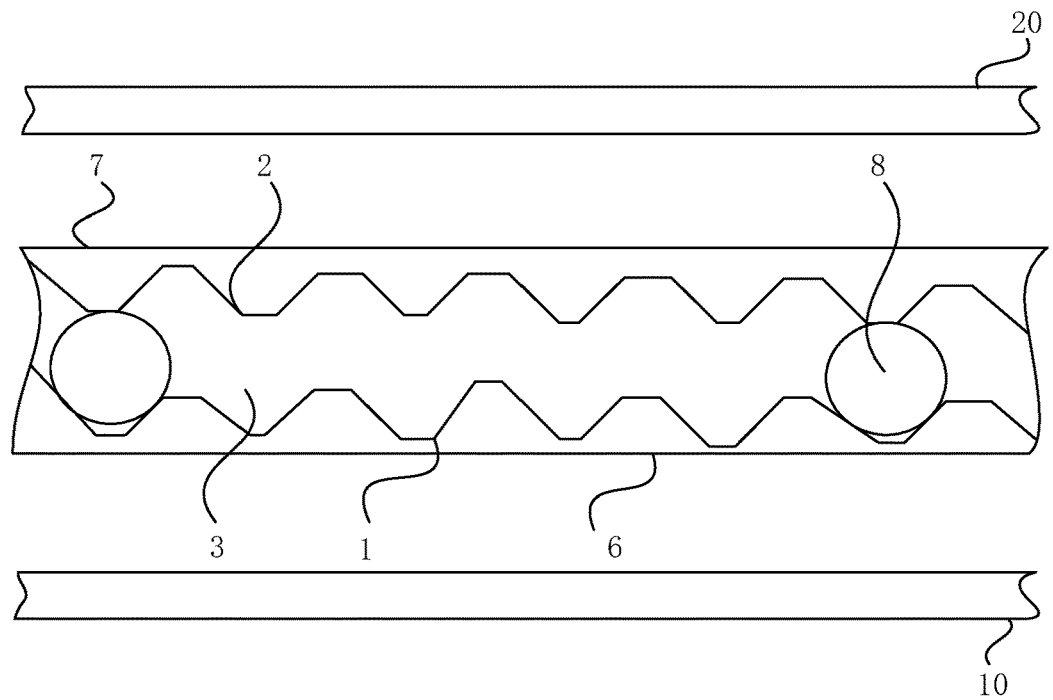
FIG. 2 is another schematic sectional view of a partial structure of a display panel provided in an embodiment of the present disclosure.

FIG. 2 is another schematic sectional view of a partial structure of a display panel provided in an embodiment of the present disclosure. In another embodiment, the force sensitive touch units are located in the frame sealant. A frame sealant layer of the display panel comprises a first sub-frame sealant layer 6 and a second sub-frame sealant layer 7 disposed opposite to each other. The plurality of force sensitive touch units are located between the first sub-frame sealant layer 6 and the second sub-frame sealant layer 7, and the plurality of force sensitive touch units are electrically connected to a touch circuit through data lines provided on the second sub-frame sealant layer 7.

When each of the force sensitive touch units has a sawtooth structure, a side of the first sub-frame sealant layer 6 facing the second sub-frame sealant layer 7 and a side of the second sub-frame sealant layer 7 facing the first sub-frame sealant layer 6 both have a sawtooth structure.

Each of the force sensitive touch units may further comprise silica balls 8 filled in the compressible insulating layer 3. The silica balls 8 function as a support, and they can both prevent leakage of liquid crystals in the display panel owing to external forces, and prevent major deformation of frame sealant areas around the display panel owing to large external forces. During preparation, the first sub-frame sealant layer 6 is formed first, whose upper surface has a sawtooth shape, and whose lower surface is a plane. The first conductive layer 1 is formed on the upper surface of the first sub-frame sealant layer 6 by means of spraying or sputtering. Then the compressible insulating layer 3 is formed on the first conductive layer 1 by spraying, and silica balls 8 are added into said compressible insulating layer 3. The specific dimension and number of the silica balls 8 as well as the spacing between the silica balls 8 can be determined according to actual needs. After forming the compressible insulating layer 3 by spraying, the upper surface of the compressible insulating layer 3 is still a sawtooth structure having the original slope. The second conductive layer 2 is formed on the upper surface of the compressible insulating layer 3. The distance between the two capacitive conductive layers can be set according to the actual need. Finally the second sub-frame sealant layer 7 is prepared on the second conductive layer 2, whose upper surface is a plane. Data lines are fabricated on the second sub-frame sealant layer 7 for electrical connection to the touch circuit.

The plurality of force sensitive touch units may be a one-piece structure or a split structure.

Of course, the force sensitive touch units may also be provided in the substrates or in color filter layers, which will not be detailed herein.

Figure 3:
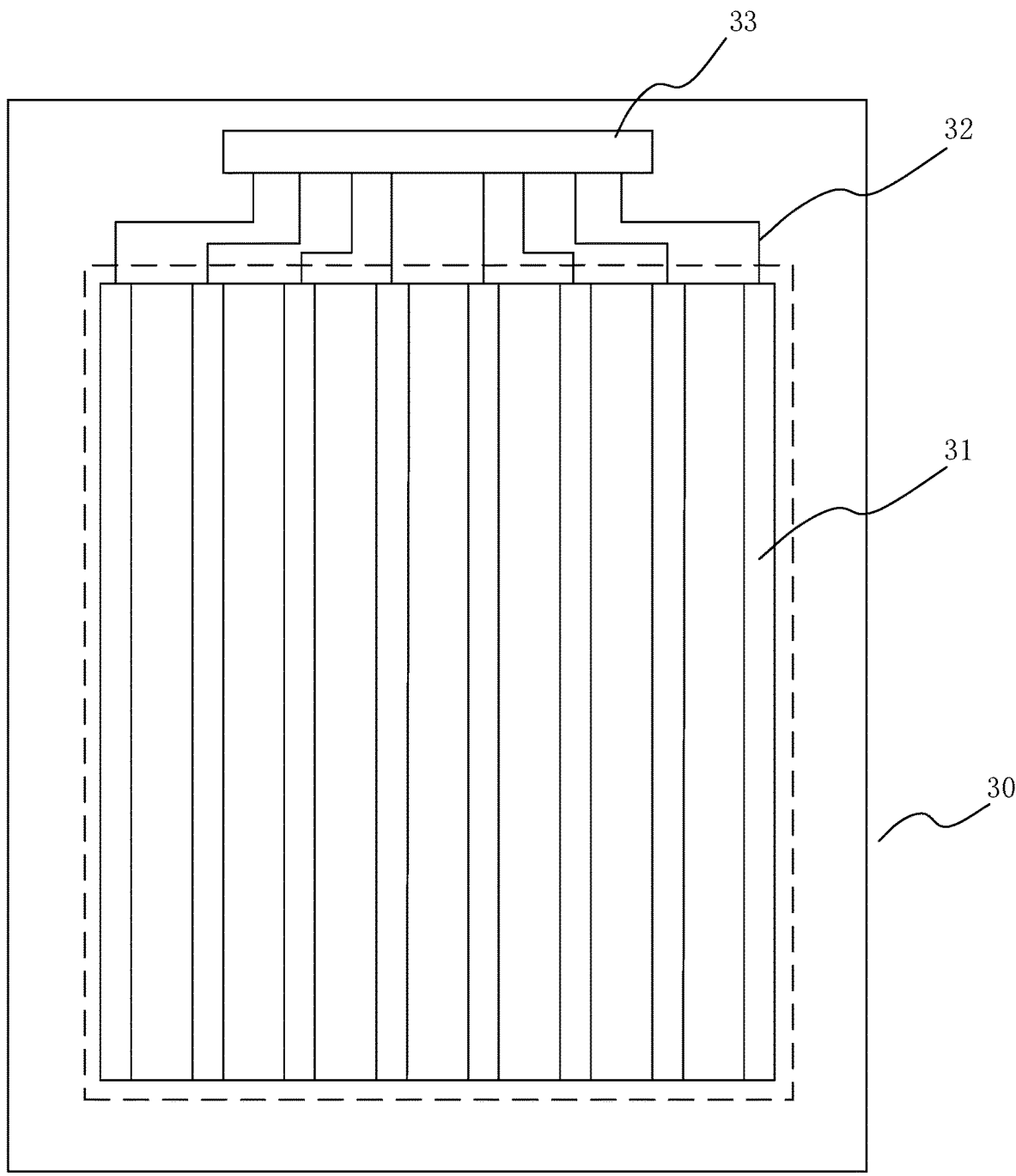
FIG. 3 is a schematic top view of a display panel provided in an embodiment of the present disclosure.

FIG. 3 is a schematic top view of a display panel provided in an embodiment of the present disclosure. The display panel 30 comprises a touch circuit 33 and a black matrix layer 31. The black matrix layer 31 of the display panel comprises: a first sub-black matrix layer and a second sub-black matrix layer disposed opposite to each other (not shown in the top view). The plurality of force sensitive touch units are located between the first sub-black matrix layer and the second sub-black matrix layer. The plurality of force sensitive touch units are electrically connected to the touch circuit through data lines 32 provided on the second sub-black matrix layer.

The present disclosure also provides a display device comprising the display panel according to any one of the above-described embodiments. Since the display panel can improve touch sensitivity of the display device, improve the structural stability of the display device and extend the service life of the display device, the display device provided by the present disclosure has better touch sensitivity, higher structural stability and longer service life.

It will be apparent to those skilled in the art that various changes and modifications can be made to the present disclosure without departing from the spirit and scope of the disclosure. Therefore, the present disclosure is intended to embrace such modifications and variations if the changes and modifications to this disclosure fall into the scope of the appended claims and the equivalents thereof.

What is claimed is:

1. A display panel, comprising:
   a first substrate and a second substrate disposed opposite to each other;
   a plurality of force sensitive touch units located between the first substrate and the second substrate, each of said plurality of force sensitive touch units being electrically connected to a touch circuit of the display panel;
   wherein, each of said force sensitive touch units includes: a first conductive layer and a second conductive layer arranged in parallel to each other, and a compressible insulating layer filled between the first conductive layer and the second conductive layer,
   wherein a black matrix layer of the display panel comprises: a first sub-black matrix layer and a second sub-black matrix layer disposed opposite to each other; the plurality of force sensitive touch units are located between the first sub-black matrix layer and the second sub-black matrix layer, and the plurality of force sensitive touch units are electrically connected to the touch circuit through data lines provided on the second sub-black matrix layer, and
   wherein when each of the force sensitive touch units has a sawtooth structure, a side of the first sub-black matrix layer facing the second sub-black matrix layer and a side of the second sub-black matrix layer facing the first sub-black matrix layer both have a sawtooth structure.

2. The display panel according to claim 1, wherein the material of the compressible insulating layer comprises: polyvinylidene fluoride.

3. A display device comprising the display panel according to claim 2.

4. A display device comprising the display panel according to claim 1.

5. A display panel, comprising:
   a first substrate and a second substrate disposed opposite to each other;
   a plurality of force sensitive touch units located between the first substrate and the second substrate, each of said plurality of force sensitive touch units being electrically connected to a touch circuit of the display panel;
   wherein, each of said force sensitive touch units includes: a first conductive layer and a second conductive layer arranged in parallel to each other, and a compressible insulating layer filled between the first conductive layer and the second conductive layer, wherein a frame sealant layer of the display panel comprises: a first sub-frame sealant layer and a second sub-frame sealant layer disposed opposite to each other; the plurality of force sensitive touch units are located between the first sub-frame sealant layer and the second sub-frame sealant layer, and the plurality of force sensitive touch units are electrically connected to said touch circuit through data lines provided on said second sub-frame sealant layer, and wherein when each of the force sensitive touch units has a sawtooth structure, a side of the first sub-frame sealant layer facing the second sub-frame sealant layer and a side of the second sub-frame sealant layer facing the first sub-frame sealant layer both have a sawtooth structure.

6. The display panel according to claim 5, wherein each of the force sensitive touch units further comprises silica balls filled in the compressible insulating layer.

7. A display device comprising the display panel according to claim 6.

8. A display device comprising the display panel according to claim 5.

9. The display panel according to claim 5, wherein the material of the compressible insulating layer comprises: polyvinylidene fluoride.

10. A display device comprising the display panel according to claim 9.

* * * * *